UNITED STATES PATENT OFFICE.

RUDOLF HAUGWITZ, OF FRIEDRICHSHAGEN, NEAR BERLIN, GERMANY, ASSIGNOR TO ACTIEN GESELLSCHAFT FÜR ANILIN FABRIKATION OF BERLIN.

POLYAZO DYE AND PROCESS OF MAKING SAME.

999,558.  Specification of Letters Patent.  Patented Aug. 1, 1911.

No Drawing.  Application filed April 6, 1911. Serial No. 619,334.

*To all whom it may concern:*

Be it known that I, RUDOLF HAUGWITZ, a subject of the Emperor of Germany, residing at Friedrichshagen, near Berlin, Germany, (my post-office address being Seestrasse 97, Friedrichshagen, near Berlin, German,) have invented certain new and useful Improvements in Polyazo Dye and Processes of Making Same, of which the following is a specification.

My invention relates to the manufacture of new polyazo dyes which may be obtained by combining one molecular proportion of a tetrazotized para-diamino compound with one molecular proportion of 1-amino-8-naphthol-2.4-disulfonic acid and one molecular proportion of a meta-diamin of the benzene series. The dyes thus manufactured produce on cotton directly blue tints, by subsequent treatment with 4-nitrodiazobenzene passing to full bluish-black tints, which can be discharged to a pure white.

The following example illustrates my invention, the parts being by weight: 13 parts of 4-aminobenzene-azo-3-amino-4-cresolmethylether:

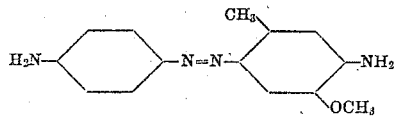

are tetrazotized in the usual manner by means of 32 parts of hydrochloric acid of 20° Baumé specific gravity at about 5° C. Into the tetrazo solution thus obtained a solution of 15.5 parts of 1-amino-8-naphthol-2.4-disulfonic acid, 3 parts of sodium carbonate and 25 parts of sodium acetate is flown. The intermediate product formed at once is mixed with a solution of 6 parts of meta-phenylenediamin and 26 parts of sodium carbonate. After stirring for several hours the mass is heated to about 60° C. and the dyestuff salted out, filtered off and dried.

The new dye as above obtained forms in the dry and pulverized shape an olive-black powder, soluble in hot water to a blue solution, assuming a violet coloration on addition of an acid. In concentrated sulfuric acid the dye dissolves to a blue solution, which on the addition of ice separates blue flakes of the unaltered dye. By reduction the new dye is split off, yielding 1.4-diaminobenzene, 2.5-diamino-4-cresolmethylether, 1.2.4-triaminobenzene and 1.7-diamino-8-naphthol-2.4-disulfonic acid.

It is obvious to those skilled in the art that my invention is not limited to the foregoing example or to the details given therein. Instead of the diamino compound used in the above example other para-diamino compounds, such as dianisidin, may be employed. The meta-phenylenediamin may be replaced by the meta-toluylenediamin, chloro-meta-phenylenediamin and the like.

Having now described my invention and the manner in which it may be performed, what I claim is,—

1. As new articles of manufacture the herein-described new polyazo-dyes dyeing cotton directly blue shades, passing to full bluish-black by treatment with 4-nitrodiazobenzene on the fiber, which new dyes may be obtained by combining one molecular proportion of a tetrazotized para-diamino compound with one molecular proportion of 1-amino-8-naphthol-2.4-disulfonic acid and one molecular proportion of a meta-diamin of the benzene series, these new dyes being in the dry and pulverized shape olive-black powders, soluble in hot water with blue color, which turns to violet on the addition of an acid, and soluble in concentrated sulfuric acid to blue solutions, which on the addition of ice separate blue flakes of the unaltered dye, being split off by reduction, and yielding a triamin of the benzene series, 1.7-diamino-8-naphthol-2.4-disulfonic acid and if the dye was made from a para-diamino compound, unalterable by reduction, this diamino compound, in the other case the reduction products of this para-diamino compound.

2. The herein-described new polyazo dye dyeing cotton directly blue shades, passing to full bluish-black by treatment with 4-nitrodiazobenzene on the fiber, which new dye may be obtained by combining one molecular proportion of the tetrazotized 4-aminobenzene-azo-3-amino-4-cresolmethylether with one molecular proportion of 1-amino-8-naphthol-2.4-disulfonic acid and one molecular proportion of a meta-diamin of the benzene series, this new dye being in the dry and pulverized shape an olive-black powder, soluble in hot water with blue color, which turns to violet on the addition of an acid, and soluble in concentrated sulfuric acid to a blue solution, which on the addition of ice separates blue flakes of the unaltered dye, being split off by reduction, and yielding 1.4-diaminobenzene, 2.5-diamino-4-cresol-methylether, 1.2.4-triaminobenzene and 1.7-diamino-8-naphthol-2.4-disulfonic acid.

In testimony whereof I have hereunto set my hand in presence of two subscribing witnesses.

RUDOLF HAUGWITZ.

Witnesses:
 HENRY HASPER,
 WOLDEMAR HAUPT.